United States Patent [19]

De Luca

[11] 4,241,633

[45] Dec. 30, 1980

[54] TRIMMER BLADE

[76] Inventor: Charles G. De Luca, 8412 E. 24th St., Tucson, Ariz. 85713

[21] Appl. No.: 18,990

[22] Filed: Mar. 9, 1979

[51] Int. Cl.³ .............................................. B23D 35/00

[52] U.S. Cl. .......................................... 83/676; 83/698

[58] Field of Search .......................... 83/666, 676, 698

[56] References Cited

U.S. PATENT DOCUMENTS

| | | | |
|---|---|---|---|
| 519,892 | 5/1894 | Newton | 83/676 X |
| 2,894,583 | 7/1959 | Johnstad | 83/676 X |
| 4,170,156 | 10/1979 | Kondo | 83/666 X |

*Primary Examiner*—Frank T. Yost

*Assistant Examiner*—Robert P. Olszewski

*Attorney, Agent, or Firm*—McGlynn and Milton

[57] ABSTRACT

A rotary tool assembly including a support shaft with a circular mounting flange mounted on the end of the support shaft and extending radially therefrom to a circular periphery. The mounting flange has a recess in the front face which extends radially inwardly from the outer circular periphery of the mounting flange to an axially extending shoulder which has a machined surface. A circular cutting blade is disposed in the first recess and has front and rear surfaces with a circular central opening extending around and engaging the machined shoulder. A circular clamping ring is disposed in a second recess in the front face of the mounting flange with an outer circular periphery disposed in overlapping relationship with the inner circular periphery of the central opening in the cutting blade to clamp the cutting blade to the mounting plate.

6 Claims, 1 Drawing Figure

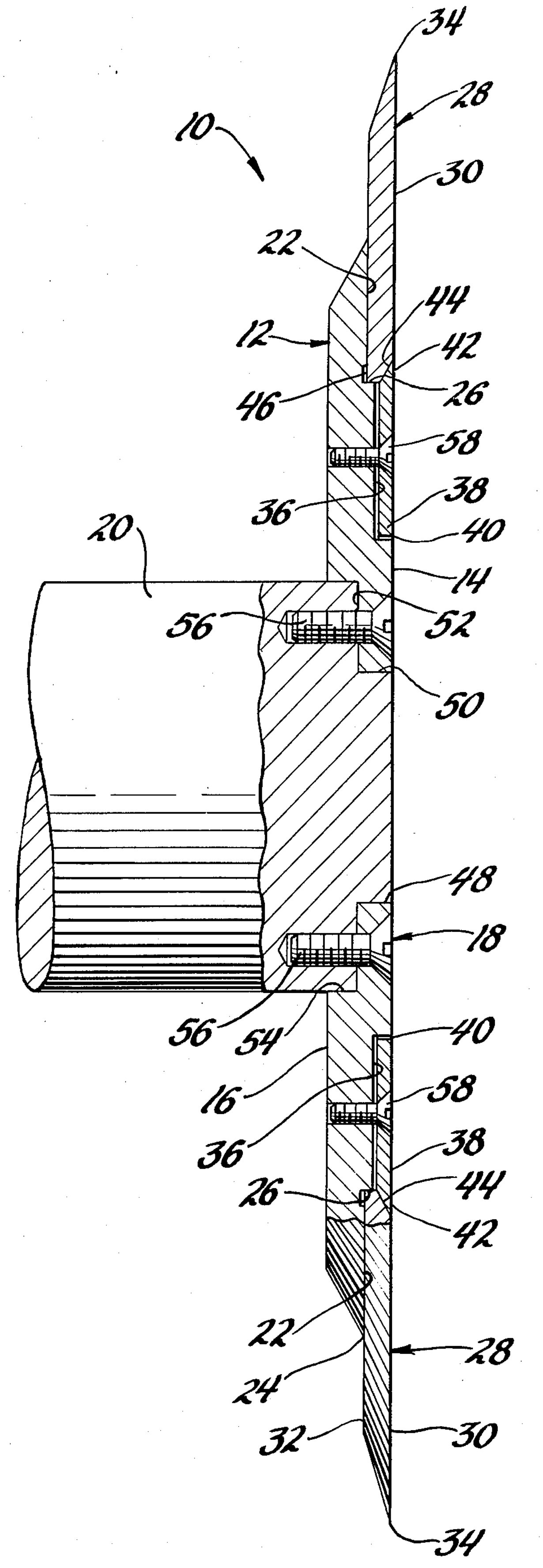
34
28
10
30
22
44
12
42
46
26
58
36
38
40
20
14
56
52
50
48
18
56
54
40
16
58
36
38
26
44
42
22
28
24
32
30
34

TRIMMER BLADE

BACKGROUND OF THE INVENTION (1) Field of the Invention

This invention relates to an improved rotary cutting tool assembly of the type utilized for cutting both ferrous and nonferrous materials. The cutting tool assembly is particularly suited to be mounted on the shaft of a cutting machine of the type utilized for cutting electrical lead wires in the electronics industry.

(2) Description of the Prior Art and Prior Art Statement

Known cutting tool assemblies of the type to which the instant invention pertains, typically include a carbide cutting blade secured to a mounting hub by soldering, brazing, welding or the like. In such instances the heat required to attach the cutting blade to the mounting hub can warp or otherwise affect the dimensions of the assembly. Additionally, the hub and cutting blade become a complete unit which must be totally replaced when the cutting blade is worn to a point that it is no longer usable.

Cutting blades have been mechanically secured to mounting flanges and an example of such is disclosed in U.S. Pat. No. 2,894,583 granted July 14, 1959 to D. Johnstad. In that assembly the mounting flange and shaft are integral and the carbide cutting blade must be of a special configuration as are the remaining components in the assembly.

In the prior art assemblies, should the cutting blade experience an exceptionally hard cutting situation whereby resistance is applied to rotation of the cutting blade, the cutting blade frequently disintegrates. This is because the cutting blade is forced to rotate with the imput shaft and cannot withstand the cutting forces in certain situations.

SUMMARY OF THE INVENTION

In accordance with the subject invention there is provided a rotary cutting tool assembly including a circular mounting flange having front and rear faces with a central mounting portion for attaching the flange to a support shaft and with the flange having a first recess in the front face thereof which extends radially inwardly from the outer circular periphery of the mounting flange to a first circular axially extending shoulder and a circular cutting blade disposed in the first recess with the cutting blade having front and rear surfaces and a circular central opening extending around and engaging the shoulder and circular clamping means removably connected to the front face of the mounting flange and radially inwardly of the cutting blade for clamping the cutting blade to the mounting flange.

In accordance with the subject invention the components are much simpler in construction and the cutting blade may slip relative to the rotation of the mounting flange in cutting situations to prevent the breakup of the cutting blade. Additionally, a given cutting blade may be utilized with different mounting flanges which are adapted to be secured to different types of support shafts.

BRIEF DESCRIPTION OF THE DRAWINGS

Other advantages of the present invention will be readily appreciated as the same becomes better understood by reference to the following detailed description when considered in connection with the accompanying drawing wherein there is disclosed a fragmentary cross-sectional view of a preferred embodiment of the rotary cutting tool assembly constructed in accordance with the subject invention.

DESCRIPTION OF THE PREFERRED EMBODIMENT

A rotary cutting tool assembly constructed in accordance with the subject invention is generally shown at 10.

The assembly includes a circular mounting flange generally indicated at 12. The mounting flange 12 has front and rear faces 14 and 16 respectively and a central mounting portion generally indicated at 18 for attaching the mounting flange 12 to a support shaft 20.

The mounting flange 12 has a first recess 22 in the front face 14 thereof. The recess 22 extends radially inwardly from the outer circular periphery 24 of the mounting flange 12 to a first circular axially extending shoulder 26. The axially extending shoulder 26 is machined to a smooth surface. The bottom of the recess 22 is flat and extends radially or perpendicularly to the axis of the mounting flange 12. The outer periphery of the mounting flange 12 is conical or tapers outwardly from the rear face 16 to the outer extremity 24.

A circular cutting blade generally indicated at 28 is disposed in the recess 22. The cutting blade 28 has front and rear surfaces 30 and 32 respectively and a central opening extending around and engaging the shoulder 26. The cutting blade 28 includes a circular peripheral cutting edge 34 which is disposed radially outwardly of the periphery 24 of the mounting flange 12. The front face 30 of the cutting blade 28 is also conical or tapered radially inwardly from the cutting edge 34 toward the rear face 32.

A circular clamping means is removably connected to the mounting flange 12 radially inwardly of the cutting blade 28 for clamping the cutting blade 28 to the mounting flange 12. Specifically, the mounting flange 12 includes a second recess 36 disposed radially inwardly of the first recess 22 and the clamping means is disposed within the second recess 36. The clamping means includes a clamping ring 38 having an inner circular opening 40 and an outer circular periphery 42 disposed in overlapping relationship with the inner circular periphery of the central opening in the cutting blade 28. The clamping ring 38 and the cutting blade have mating conical surfaces as indicated at 44 at the overlapping portions thereof, i.e., the outer periphery 42 of the clamping ring 38. The mating conical surfaces are disposed in a cone having its apex rearwardly of the mounting flange 12.

The first recess 22 is deeper than the second recess 36 and the second recess 36 extends radially inwardly to a second axially extending shoulder adjacent the inner periphery 40 of the clamping ring 38. The second shoulder extends from the bottom of the second recess 36 forwardly to the front face 14 of the mounting flange 12.

The clamping ring 38 has a rear surface spaced from the bottom of the recess 36 for clamping the rear surface 32 of the cutting blade 28 tightly against the bottom of the first recess 22. This space allows for a clamping tolerance to assure that the clamping ring 38 is always tightly against the cutting blade 28. In a similar fashion, the inner circular opening 40 of the clamping ring 38 is at least in part spaced from the shoulder defined by the second recess 36. This is so the clamping ring may adjust itself to account for tolerances radially with respect to the mounting flange 12 when clamped in position. The cutting blade 28 is precisely positioned because of its tight engagement with the machined shoulder 26. Further, there is an annular groove 46 extending into the bottom of the first recess 22 contiguous with the shoulder 26 to prevent the rear face 32 of the cutting blade 28 from engaging the bottom of the recess 22 at the first shoulder 26. In other words, the positioning of the cutting blade 28 is determined by its inner circular opening engaging the shoulder 26 and its rear face 32 engaging the bottom of the recess 22 but without the rear face 32 engaging the bottom of the recess 22 immediately adjacent or contiguous with the shoulder 26.

The mounting portion 18 of the mounting flange 12 includes a central hole 48 which receives a circular projection 50 on the end of the support shaft 20. The mounting portion 18 also includes a third recess 52 in the rear face 16 of the mounting flange 12. The recess 52 extends radially outwardly from the central hole 48 to a shoulder 54 for receiving the end of the support shaft 20. There is also included a plurality of mounting holes extending therethrough and spaced around the third recess 52 for receiving the fasteners 56 to attach the mounting flange 12 to the end of the shaft 20.

Also included in the clamping means are a plurality of conically shaped holes through the clamping plate 38 with conical head screws 58 extending through the holes and threaded into the mounting flange 12 in the bottom of the second recess 36.

The front surface 30 of the cutting blade 28 is preferably aligned radially with the front face 14 of the mounting flange 12 and the clamping ring 38 does not extend forwardly of that plane, although the clamping ring 38 may be disposed below or rearwardly of that plane.

As will be appreciated, since the cutting blade 28 is mechanically connected to the mounting plate 12, there is no heat to cause stress or fracturing of the cutting blade 28 as occurs when cutting blades are brazed to a mounting flange. Further, in the event the cutting blade 28 experiences high-torque cutting, the mounting flange 12 may continue to rotate relative to the cutting blade 28 as there is a slipping or clutching action of the cutting blade 28 relative to the mounting flange 12 and the clamping ring 38. In addition, because of the arrangement of the components and the positioning of the cutting blade 28 relative to the mounting flange 12, there is provided a more precise and balanced assembly. Further, various different mounting flanges 12 may be utilized with the same size cutting blade 28 whereby a cutting blade 28 may be utilized on various different shaft configurations. In other words, the mounting flanges 12 may be the same except for the central mounting portion thereof which may vary depending upon the type of shaft to which the assembly is to be attached. Further, in the subject assembly the configuration of the cutting blade 28 is of a straightforward geometrical configuration with all of the obvious advantages. The mounting components are not complex and facilitate the rapid removal and replacement of cutting blades.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A rotary cutting tool assembly comprising; a circular mounting flange having front and rear faces and a central mounting portion for attaching the flange to a support shaft, said flange having a first recess in said front face thereof, said first recess extending radially inwardly from the outer circular periphery thereof to a first circular axially extending shoulder defined by a machined smooth surface, a circular cutting blade disposed in said first recess, said cutting blade having front and rear surfaces and a circular central opening extending around and engaging said shoulder, said cutting blade having a circular peripheral cutting edge disposed radially outwardly of the periphery of said mounting flange, said mounting flange including a second recess disposed radially inwardly of said first recess, a circular clamping means disposed within said second recess and removably connected to said mounting flange radially inwardly of said cutting blade for clamping said cutting blade to said mounting flange, said clamping means including a clamping ring having an inner circular opening and an outer circular periphery disposed in overlapping relationship with the inner circular periphery of said central opening in said cutting blade, said clamping ring and said cutting blade having mating conical surfaces at the overlapping portions thereof, said clamping ring having a rear surface spaced from the bottom of said second recess for clamping the rear surface of said cutting blade tightly against the bottom of said first recess, and wherein said first recess is deeper than said second recess and said second recess extends radially inwardly to a second axially extending shoulder, said second shoulder extends from the bottom of said second recess to said front face of said mounting flange, said inner circular opening of said clamping ring is at least in part spaced from said second shoulder.

2. An assembly as set forth in claim 1 wherein said mounting portion of said flange includes a central hole for receiving a projection on the end of a support shaft.

3. An assembly as set forth in claim 2 wherein said mounting portion further includes a third recess in said rear face thereof and extending radially outwardly from said central hole for receiving the end of the support shaft.

4. An assembly as set forth in claim 3 wherein said clamping means further includes a plurality of conical holes through said clamping plate and conical head screws extending through said holes and threaded into said mounting flange in the bottom of said second recess.

5. An assembly as set forth in claim 4 wherein said mounting flange includes mounting holes extending therethrough and spaced around said third recess.

6. An assembly as set forth in claim 1 wherein said mounting flange includes an annular groove extending into the bottom of said first recess contiguous with said first shoulder to prevent said rear face of said cutting blade from engaging the bottom of said first recess at said first shoulder.

* * * * *